(12) United States Patent
Kozlow et al.

(10) Patent No.: US 9,304,514 B2
(45) Date of Patent: Apr. 5, 2016

(54) METHOD AND DEVICE FOR GUIDING AN AIRCRAFT DURING A LOW LEVEL FLIGHT

(71) Applicant: Airbus Operation (S.A.S.), Toulouse (FR)

(72) Inventors: Boris Kozlow, Toulouse (FR); Yohann Roux, Cugnaux (FR); Julien Nico, Tournefeuille (FR)

(73) Assignee: AIRBUS OPERATIONS SAS, Toulouse (FR)

(*) Notice: Subject to any disclaimer, the term of this patent is extended or adjusted under 35 U.S.C. 154(b) by 0 days.

(21) Appl. No.: 14/590,996

(22) Filed: Jan. 7, 2015

(65) Prior Publication Data

US 2015/0192926 A1 Jul. 9, 2015

(30) Foreign Application Priority Data

Jan. 8, 2014 (FR) ...................... 14 50130

(51) Int. Cl.
*G01S 13/94* (2006.01)
*G05D 1/02* (2006.01)
*G05D 1/10* (2006.01)
*G08G 5/00* (2006.01)
*G05D 1/06* (2006.01)

(52) U.S. Cl.
CPC ............. *G05D 1/0202* (2013.01); *G01S 13/94* (2013.01); *G05D 1/0646* (2013.01); *G05D 1/101* (2013.01); *G08G 5/0086* (2013.01)

(58) Field of Classification Search
CPC ... G05D 1/0202; G05D 1/0646; G05D 1/101; G05D 5/045; G05D 5/0086; G01S 13/9303; G01S 13/94; G08G 5/0086; G08G 5/045

USPC ........................................................ 701/3, 301
See application file for complete search history.

(56) References Cited

U.S. PATENT DOCUMENTS

| | | | | |
|---|---|---|---|---|
| 3,998,412 A * | 12/1976 | Baker | ................... | G05D 1/101 244/189 |
| 7,173,545 B2 * | 2/2007 | Berthe | ................... | G01C 5/005 340/945 |
| 7,428,451 B2 * | 9/2008 | Artini | ................... | G05D 1/0646 701/120 |
| 7,493,197 B2 * | 2/2009 | Bitar | ...................... | G01C 21/20 342/29 |
| 8,046,119 B2 * | 10/2011 | Bitar | ...................... | G01C 21/20 340/971 |
| 2005/0273223 A1 | 12/2005 | Artini et al. | | |
| 2008/0027647 A1 * | 1/2008 | Ansell | ................. | G01S 13/9303 701/301 |
| 2008/0046171 A1 | 2/2008 | Bitar et al. | | |

(Continued)

FOREIGN PATENT DOCUMENTS

EP 1369665 A2 * 12/2003 ............. G01C 5/005

OTHER PUBLICATIONS

EPO machine translation of EP 1369665 A2 (original EP document published Dec. 10, 2003).*

(Continued)

*Primary Examiner* — Behrang Badii
*Assistant Examiner* — David Testardi
(74) *Attorney, Agent, or Firm* — Greer, Burns & Crain, Ltd.

(57) ABSTRACT

A calculation unit configured to define a safety corridor, whose width is increased compared with a nominal width, at least by one width of an escape trajectory with a spiral climb of the aircraft, wherein the safety corridor that is thus defined by the calculation unit is used by a construction unit for forming a flight trajectory for a low level flight of an aircraft.

12 Claims, 3 Drawing Sheets

(56) References Cited

U.S. PATENT DOCUMENTS

| | | | |
|---|---|---|---|
| 2008/0174454 A1* | 7/2008 | Bitar | G01C 23/00 340/975 |
| 2008/0208400 A1* | 8/2008 | Bouchet | G01C 23/00 701/4 |
| 2010/0274419 A1* | 10/2010 | Lacombe | G08G 5/0065 701/4 |
| 2010/0324757 A1* | 12/2010 | Hoofd | G05D 1/0202 701/3 |
| 2014/0081505 A1* | 3/2014 | Klinger | G08G 1/162 701/25 |

OTHER PUBLICATIONS

Barfield, Finley, "Autonomous collision avoidance—the technical requirements", Proceedings of the IEEE 2000 National Aerospace and Electronics Conference, NAECON 2000, Oct. 10-12, 2000, pp. 808-813.*

Preliminary French Search Report (for FR 1450130 FA 793506), dated Oct. 23, 2014, 2 pages.*

* cited by examiner

METHOD AND DEVICE FOR GUIDING AN AIRCRAFT DURING A LOW LEVEL FLIGHT

CROSS-REFERENCES TO RELATED APPLICATIONS

This application claims the benefit of the French patent application No. 1450130 filed on Jan. 8, 2014, the entire disclosures of which are incorporated herein by way of reference.

BACKGROUND OF THE INVENTION

The present invention concerns a method and a device for guiding an aircraft during a low level flight.

A low level (or low altitude) flight phase, known as an LLF (Low Level Flight) phase, usually enables an aircraft to fly at low level, notably to follow the overflown terrain as closely as possible, in particular to avoid being picked out, at the same time as eliminating all risk of collision with a portion of the terrain. Such an LLF phase is generally situated at a predetermined terrain height, for example 500 feet (approximately 150 meters).

In particular, for a military aircraft, notably a military transport aircraft, one of the objectives of a low level flight is to benefit from the masking effect of the terrain to provide protection against threats in hostile geographical areas. To this end, in particular to carry out operations when flying on instruments under IMC (Instrument Meteorological Conditions), a three-dimensional reference trajectory is calculated in the usual way (taking into account the overflown terrain), and the aircraft is guided along this reference trajectory (either automatically by means of an automatic pilot system or manually by following information shown by a flight director).

The terrain used to calculate the reference trajectory is the terrain situated in a corridor, referred to hereinafter as the safety corridor, around the horizontal portion of the reference trajectory.

The width of the safety corridor is usually predefined to ensure the safety of the flight in IMC type flying, considering all flight conditions that could divert the aircraft from its reference trajectory.

Deviations with respect to the reference trajectory may be caused by faults in systems of the aircraft. The safety corridor is generally symmetrical on either side of the horizontal trajectory, deviations to the right or to the left of the trajectory being equally probable. The width of the safety corridor is the result of summing various error values that correspond to the performance of the various systems that contribute to the calculation of and to flying the trajectory. These are different causes liable to generate lateral deviations relative to the reference trajectory. There may be cited by way of example an error value relating to guidance, which his determined by measuring the maximum deviation considering all flight conditions and the faults affecting a guidance function, and an error value relating to the determination of the position of the aircraft, which is used to implement the guidance function. The guidance function (implemented via an automatic pilot system or a flight director) in fact relies on very precise and very reliable information as to the position of the aircraft.

If a fault is detected in one of the systems necessary for correct execution of an LLF operation, the crew is alerted and must trigger an escape maneuver, because continuing to fly under these degraded conditions is no longer safe. This escape maneuver comprises causing the aircraft to climb to a safety altitude at which there is no longer any risk of the aircraft colliding with the overflown terrain. During the escape maneuver, the aircraft usually continues to be guided laterally along the lateral (or horizontal) portion of the reference trajectory and a maximum rate of climb is applied to it. A portion of the safety corridor also serves to cover lateral deviations of the aircraft with respect to the reference trajectory during an escape maneuver (following a system fault, for example).

In particular, the escape maneuver may be initiated following a fault affecting one of the position sensors that enable the position of the aircraft to be generated. The minimum number of position sensors installed onboard the aircraft depends on the target safety level. To guide an aircraft in complete safety along a trajectory situated in a corridor, under IMC type flight conditions, at least two independent position sensors are necessary. Because in the aforementioned current procedure the aircraft must also be guided along the horizontal portion of the trajectory during the escape maneuver two position sensors are also necessary during this maneuver. Consequently, to allow LLF operations in IMC type flight, at least three independent position sensors must be provided (because two sensors are necessary for guidance during the escape maneuver and this maneuver may be triggered following a fault affecting one of these sensors).

SUMMARY OF THE INVENTION

An object of the present invention is to remedy the aforementioned disadvantages. The present invention concerns a method for guiding an aircraft during a low level flight enabling flying with two independent position sensors (instead of three in the usual mode of execution of the LLF operation), while enabling an escape maneuver to be effected in complete safety even after failure of a position sensor.

In accordance with the invention, the method of the type including steps comprising:

a) constructing a flight trajectory as a function of the relief of the overflown terrain and a safety corridor, the safety corridor defining limits on either side of the flight trajectory at least in the lateral plane (or horizontal plane) and having at least a nominal width; and b) guiding the aircraft along the flight trajectory, is noteworthy in that it includes a supplementary step, before step a) and comprising defining a safety corridor, the width of which is increased, relative to the nominal width, by at least one so-called escape width corresponding to a width of an escape trajectory with a spiral climb of the aircraft, the safety corridor defined in this way being used in step a) to construct the flight trajectory.

In accordance with the invention, the width of the safety corridor is therefore increased so that a particular escape maneuver can be carried out (laterally) inside this safety corridor, this escape maneuver remaining safe up to the safety altitude.

The escape maneuver to be carried out (either automatically using an automatic pilot system or manually in accordance with instructions given by a flight director) still comprises causing the aircraft to climb at a maximum rate of climb (in the usual way), but this entails executing a lateral turn maneuver that enables the aircraft to remain within the (safe) limits of the safety corridor without using the position of the aircraft (which may be unavailable to incorrect). More particularly, by carrying out complete concentric turns, the resulting maneuver is a climb maneuver following a spiral of constant turn radius (with respect to the mass of air around the aircraft).

The escape width preferably corresponds at least to twice a minimum possible turn radius of the aircraft (representing the tightest possible turn of the aircraft). The escape width advantageously also takes into account the effect of a side wind on the flight of the aircraft. The trace on the ground of the trajectory is of elliptical shape with a lateral offset caused by the side wind between each complete turn. The elliptical shape, as well as the lateral offset, are taken into account in the calculation of the width of the safety corridor.

In a first embodiment, the width of the safety corridor is increased by a single escape width defined laterally on one side only relative to a longitudinal axis of safety corridor, representing the flight trajectory in the horizontal plane (or horizontal trajectory). In this first embodiment, the safety corridor is laterally dissymmetrical with respect to the horizontal trajectory.

Moreover, in a second embodiment, the width of the safety corridor is increased by two escape widths defined on either side of a longitudinal axis of the safety corridor. In this second embodiment, the safety corridor is laterally symmetrical with respect to the horizontal trajectory.

Moreover, in a preferred embodiment, the method includes a so-called escape supplementary step comprising, when guiding the aircraft along the flight trajectory, carrying out an escape maneuver if necessary. This escape maneuver comprising causing the aircraft to climb to a safety height, by causing the aircraft to fly in a spiral climb maneuver with a turn having the minimum possible turn radius, in accordance with a rotation direction directed toward a side of the safety corridor on which the safety corridor is widened by an escape width, that is to say toward the side on which the escape width is provided if the safety corridor includes a single escape width, or toward either side if the safety corridor includes two escape widths, one on each side.

The present invention also concerns a device for guiding an aircraft during a low level flight.

In accordance with the invention, the guidance device of the type including:
 a construction unit configured to construct a flight trajectory of the aircraft, as a function of the relief of the overflown terrain and a safety corridor, the safety corridor defining limits on either side of the flight trajectory at least in the lateral plane and having at least one nominal width; and
 a guidance unit configured to guide the aircraft along the flight trajectory,
 is noteworthy in that it additionally includes a calculation unit configured to define a safety corridor, the width of which is increased relative to the nominal width by at least one so-called escape width corresponding to a width of an escape trajectory with a spiral climb of the aircraft, the safety corridor defined in this way by the calculation unit being used by the construction unit to construct the flight trajectory.

Moreover, in a preferred embodiment, the guidance unit is configured to implement an escape maneuver as described above.

Also, the guidance device advantageously also includes a unit for detecting a fault condition of at least one specific system of the aircraft, notably a system for determining the position of the aircraft, an escape maneuver being triggered to be implemented by the guidance unit if the detection unit detects any such fault condition.

The present invention also concerns an aircraft, in particular a transport aircraft, notably a military transport aircraft, that includes a guidance device as specified above.

BRIEF DESCRIPTION OF THE DRAWINGS

The figures of the appended drawings explain clearly how the invention may be reduced to practice. In these figures, identical references designate similar elements.

DETAILED DESCRIPTION OF THE PREFERRED EMBODIMENTS

Figure 1:
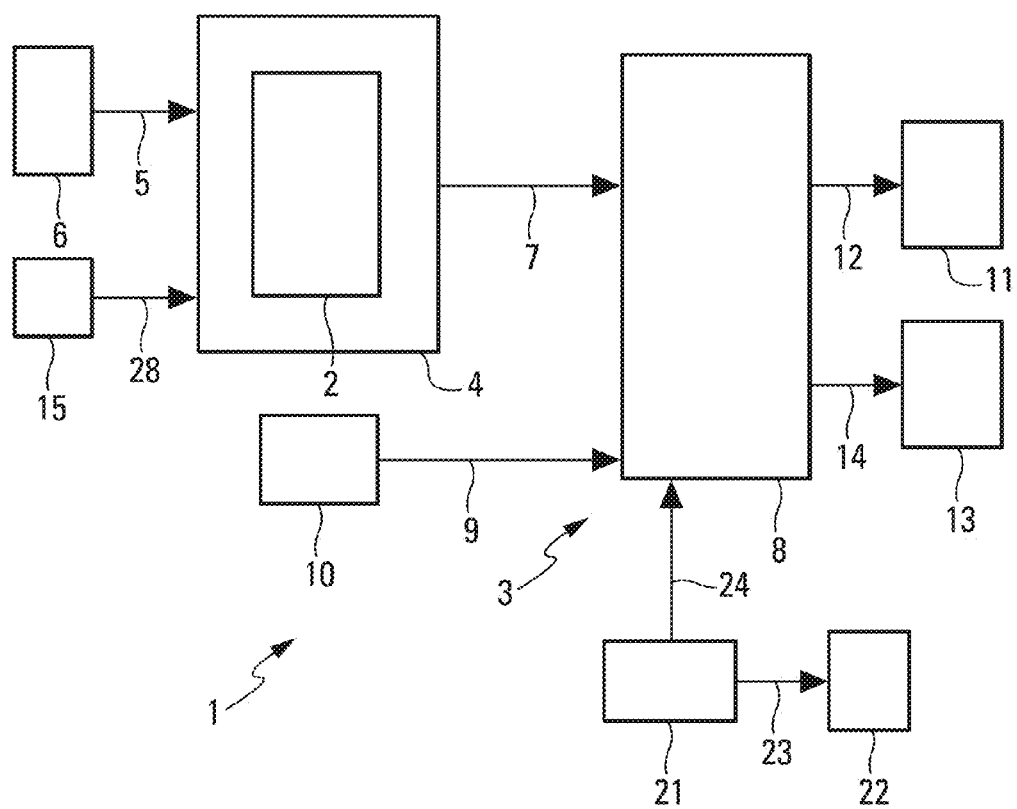
FIG. 1 is a block schematic of a guidance device that illustrates one embodiment of the invention.

The guidance device 1 represented diagrammatically in FIG. 1 to illustrate the invention is intended to guide automatically an aircraft AC, in particular a military transport aircraft, during a low level flight along a low level flight trajectory.

To this end, this guidance device 1 that is onboard the aircraft AC includes:
 a construction unit 2 configured to construct a three-dimensional flight trajectory of the aircraft AC as a function of the relief of the overflown terrain and a safety corridor; and
 a guidance unit 3 configured to guide the aircraft AC along the flight trajectory.

In one particular embodiment, the construction unit 2 is part of a central unit 4 preferably corresponding to a flight management system (FMS). This central unit 4 is connected by a connection 5 to a set 6 of the usual information sources and by a connection 7 to a calculation unit 8 preferably corresponding to a flight guidance computer (FGC) of the guidance unit 3. The calculation unit 8 is such as to calculate guidance setpoints as a function of the flight trajectory (notably at low level) received from the construction unit 2 via the connection 7 and a current position indication received via a connection 9 from a system 10 for determining the current position of the aircraft AC. This usual type system 10 may notably include a position calculator that generates the current position of the aircraft from information received from position sensors and in particular information received from GPS receivers and/or one or more inertial and air data generator units.

The guidance unit 3 includes, in addition to the calculation unit 8:
 a usual automatic pilot system 11 that is able to pilot the aircraft AC automatically as a function of guidance instructions received from the calculation unit 8 via a connection 12; and/or
 a flight director 13 that slows piloting indications to the pilot on a dedicated screen as a function of guidance instructions received from the calculation unit 8 via a connection 14.

The flight trajectory TV (FIGS. 4 and 5) is constructed in the usual way by the construction unit 2 as a function of the relief of the overflown terrain and a safety corridor 16A, 16B. The safety corridor 16A, 16B defines limits (L1A and L2A for 16A and L1B and L2B for 16B) on either side of the flight trajectory (shown by a longitudinal axis 18 in FIGS. 2 and 3) at least in the lateral (or horizontal) plane and has at least a nominal width 17.

In the usual way, the width of the safety corridor 16A, 16B is defined to ensure the safety of the flight, considering all flight conditions that could cause the aircraft AC to deviate from its reference trajectory (flight trajectory TV to be followed) and cause the aircraft AC to collide with the terrain (leaving the safety corridor 16A, 16B being considered catastrophic). Deviations with respect to the reference trajectory may be caused by faults affecting various systems of the aircraft, such as the system 10 for example. The width of the safety corridor is the result of summing various error values that correspond to the performance of the various systems that contribute to the calculation of and to flying the trajectory. These include various causes liable to generate lateral deviations with respect to the reference trajectory.

Figure 2:
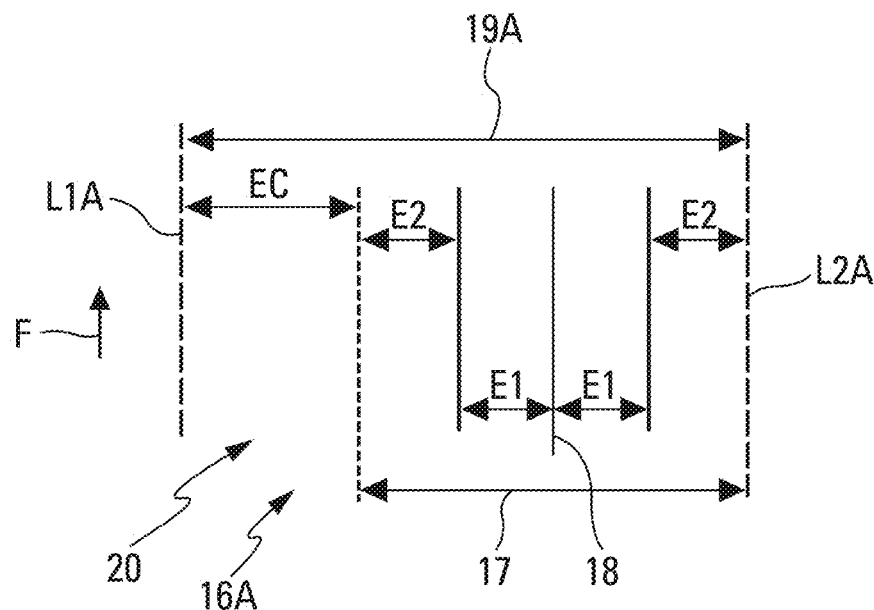
FIGS. 2 and 3 show diagrammatically different examples of safety corridors.
Figure 3:
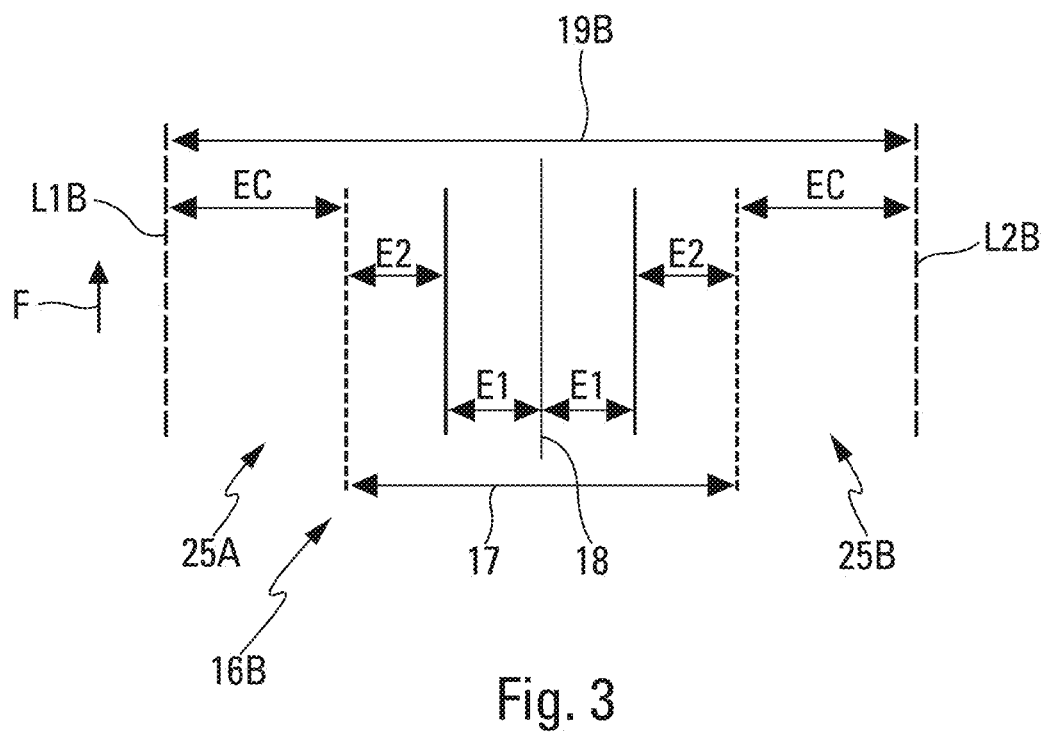

For example, as shown in FIGS. 2 and 3, the nominal width 17 may correspond in the usual way to the sum of the following error values:

an error value E1 that relates to guidance, which is determined by measuring the maximum deviation considering all flight conditions and faults affecting a guidance function of the guidance device 1, and which applies on either side of the longitudinal axis 18; and an error value E2 that relates to the determination (by the system 10) of the position of the aircraft AC, used to implement the guidance function, and which likewise applies on either side of the longitudinal axis 18.

In accordance with the invention, the guidance device 1 further includes a calculation unit 15 configured to define a safety corridor 16A, 16B the width 19A, 19B of which is increased relative to the aforementioned nominal width 17 by at least one so-called escape width EC. This escape width EC corresponds to a width of an escape trajectory with spiral climb of the aircraft AC, as specified hereinafter. The safety corridor 16A, 16B defined in this way by the calculation unit 15 is transmitted to the construction unit 2 via a connection 28 and is used by this construction unit 2 to construct the flight trajectory TV.

In accordance with the invention, the width 19A, 19B of the safety corridor 16A, 16B is therefore increased so that a particular escape maneuver (spiral climb) may be carried out (laterally) inside this safety corridor 16A, 16B, this escape maneuver remaining safe up to a safety altitude.

In particular, in accordance with the invention, the guidance device 1 will necessitate the use of only two independent position sensors for carrying out an LLF operation in IMC type flight instead of three position sensors at present.

The escape width EC corresponds at least to twice a minimum possible turn radius of the aircraft AC, which depends on the capabilities of the aircraft AC and is predetermined.

Moreover, in a preferred embodiment, the escape width EC is defined so as also to take into account the effect of a side wind (that is to say the effect of a wind having at least a lateral component relative to the flight trajectory) on the flight trajectory of the aircraft AC, namely a possible lateral offsetting of the climb spiral (specified hereinafter) caused by the wind.

In a first embodiment represented in FIG. 2, the width 19A of the safety corridor 16A is increased by a single escape width EC defined laterally on one side 20 only relative to the longitudinal axis 18 of the safety corridor 16A, namely on the left-hand side in the direction of flight F of the aircraft AC. In this first embodiment, the safety corridor 16A is laterally dissymmetrical with respect to the longitudinal axis 18 representing the horizontal trajectory TV (as shown in FIG. 4 which shows an escape maneuver with such a safety corridor 16A), but has a small width.

Figure 4:
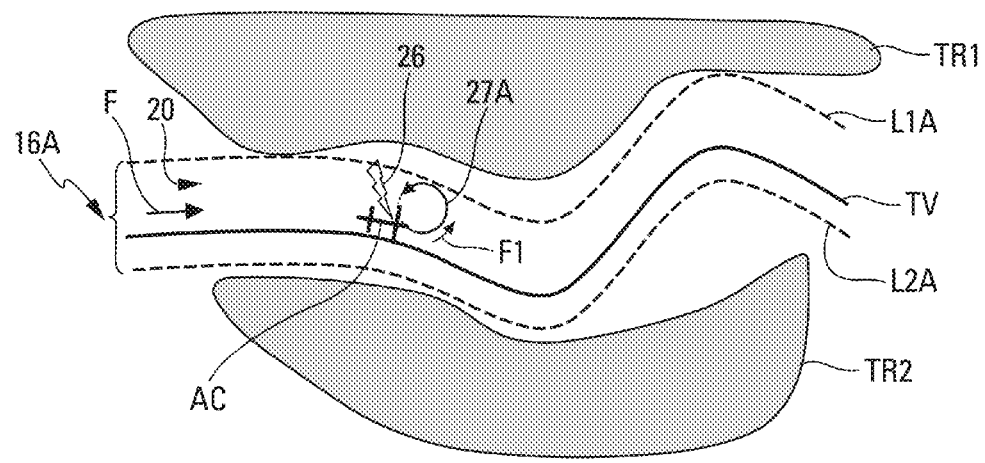
FIGS. 4 and 5 show escape maneuvers carried out for two different safety corridors, corresponding to those of FIGS. 2 and 3, respectively.

So as not to increase too much the width 19A of this safety corridor 16A, the escape maneuver will therefore always be carried out on the same side 20 of the flight trajectory TV, as shown in FIG. 4.

Figure 5:
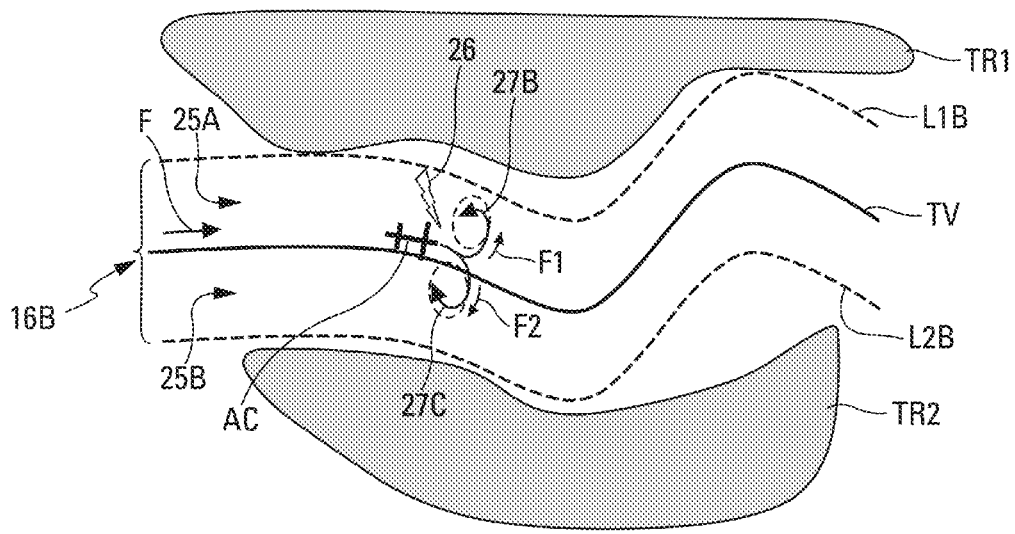

Moreover, in a second embodiment shown in FIG. 3, the width 19B of the safety corridor 16B is increased by two escape widths EC that are defined on either side of the longitudinal axis 18 (that is to say the two sides 25A and 25B). In this second embodiment, the safety corridor 16B is laterally symmetrical with respect to the horizontal trajectory TV (longitudinal axis 18), as also shown in FIG. 5 which shows an escape maneuver with such a safety corridor 16B.

If there is no dedicated side for carrying out the escape maneuver (with a spiral climb, as specified hereinafter), the width EC of the spiral (diameter of the turn) must therefore be included twice to obtain the width 19B of the safety corridor 16B on each side of the horizontal trajectory. The width 19B of the safety corridor 16B is greater (by the amount EC) than that 19A of the safety corridor 16A, and the resulting flight trajectory TV will in principle be higher with respect to the terrain.

Moreover, the guidance device 1 also includes a unit 21 for detecting a fault condition of a system, for example the system 10, of the aircraft AC. The unit 21 is described in a general way and can employ the detection of different types of fault affecting the progress of the flight. In particular, it may comprise a failed system, which sends directly fault information concerning it.

An escape maneuver is implemented by the guidance unit 3 if the detection unit 21 detects a fault condition. In fact, if a fault affecting one of the systems necessary for the correction execution of an LLF operation is detected by the detection unit 21, as shown by a symbol 26 in FIGS. 4 and 5, the crew is alerted by an alert unit 22 (of audible and/or visual type) installed in the cockpit of the aircraft AC and connected via a connection 23 to the detection unit 21. In this case, the crew triggers an escape maneuver because continuing the flight under these degraded conditions is no longer safe. The escape maneuver may also be triggered automatically, for example via a connection 24 that is connected to the central unit 8 (or to a piloting system 11, 13). This escape maneuver comprises causing the aircraft AC to climb to a usual safety altitude at which there is no longer any risk of the aircraft AC colliding with the overflown terrain TR1, TR2.

The escape maneuver to be carried out (either automatically by means of the automatic pilot system 11 or manually by following instructions calculated and supplied by the flight director 13) still comprises causing the aircraft AC to climb at a maximum rate of climb (in the usual way), but to do so while executing a lateral maneuver 27A (FIG. 4), 27B and 27C (FIG. 5) that enables the aircraft AC to remain within the limits L1A, L2A; L1B, L2B) of the safety corridor 16A, 16B without using the position of the aircraft AC (which may not be available or be incorrect). More particularly, by carrying out complete concentric turns, the resulting maneuver 27A, 27B, 27C is a spiral climb maneuver at constant (minimum) turn radius.

The guidance unit 3 is therefore configured to implement an escape maneuver comprising causing the aircraft AC to climb to a safety height, by causing the aircraft AC to fly a spiral turn maneuver 27A, 27B, 27C with a turn having a minimum possible turn radius of the aircraft AC. The turn is initiated in accordance with a rotation direction F1, F2 corresponding to a side of the safety corridor 16A, 16B on which the safety corridor 16A, 16B has an escape width, that is to say toward the left for the FIG. 4 safety corridor example and in either direction for the FIG. 5 example.

In these FIGS. 4 and 5, the aircraft AC is not exactly on the flight trajectory TV at the moment the escape maneuver is triggered, but is still located in the corresponding safety corridor 16A, 16B. Moreover, in these FIGS. 4 and 5, the spiral maneuver 27B, 27C has a more elongate shape transversely to the flight trajectory TV, to take account of a side wind. To be more precise, the trace of the trajectory on the ground is of elliptical shape with a lateral offset caused by the side wind between each complete turn. The elliptical shape and the lateral offset are taken into account in calculating the width of the safety corridor.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method of guiding an aircraft during a low level flight, the method including steps comprising:
    defining a safety corridor, a width of which is increased, relative to a nominal width, by at least one escape width corresponding to a width of an escape trajectory defined by a spiral climb of the aircraft;
    constructing a flight trajectory as a function of a relief of an overflown terrain and the defined safety corridor, the safety corridor defining limits on either side of the flight trajectory at least in a lateral plane;
    guiding the aircraft along the flight trajectory; and
    when a fault condition is detected in a system necessary for execution of a low level flight operation, performing an escape maneuver, while guiding the aircraft, by causing the aircraft to climb to a safety height, and causing the aircraft to fly in accordance with a spiral climb maneuver with a turn having a minimum turn radius of the aircraft, in accordance with a rotation direction directed toward a side of the safety corridor on which the safety corridor is widened by the escape width so that the aircraft remains within the limits of the safety corridor.

2. The method as claimed in claim 1, wherein the width of the safety corridor is increased by a single escape width defined laterally on one side relative to a longitudinal axis of the safety corridor.

3. The method as claimed in claim 1, wherein the width of the safety corridor is increased by two escape widths defined on either side of a longitudinal axis of the safety corridor.

4. The method as claimed in claim 1, wherein the escape width corresponds at least to twice the minimum turn radius of the aircraft.

5. The method as claimed in claim 4, wherein the escape width takes into account an effect of a side wind on the flight of the aircraft.

6. The method as claimed in claim 1, wherein the spiral climb maneuver has an elongate or elliptical shape transversely to the flight trajectory based on an extent of a side wind relative to the flight trajectory.

7. The method as claimed in claim 6, wherein the elongate or elliptical shape of the spiral climb maneuver has a lateral offset based on the side wind, and is used in calculating the width of the safety corridor.

8. A device for guiding an aircraft during a low level flight, the device including:
    a construction unit configured to construct a flight trajectory of the aircraft, as a function of a relief of an overflown terrain and a safety corridor, the safety corridor defining limits on either side of the flight trajectory at least in a lateral plane and having at least a nominal width;
    a guidance unit configured to guide the aircraft along the flight trajectory;
    a calculation unit configured to define the safety corridor, a width of which is increased, relative to the nominal width, by at least one escape width corresponding to a width of an escape trajectory defined by a spiral climb of the aircraft, the safety corridor defined in this way by the calculation unit being used by the construction unit to construct the flight trajectory; and
    wherein the guidance unit is configured to implement an escape maneuver when a fault condition is detected in a system necessary for execution of a low level flight operation, by causing the aircraft to climb to a safety height, and causing the aircraft to fly in accordance with a spiral climb maneuver with a turn having a minimum turn radius of the aircraft, in accordance with a rotation direction directed toward a side of the safety corridor on which the safety corridor is widened by the escape width so that the aircraft remains within the limits of the safety corridor.

9. The device as claimed in claim 8, further comprising a unit for detecting a fault condition of at least one system of the aircraft, the escape maneuver being triggered to be implemented by the guidance unit when the detection unit detects the fault condition.

10. An aircraft comprising a guidance device according to claim 8.

11. The device as claimed in claim 8, wherein the spiral climb maneuver has an elongate or elliptical shape transversely to the flight trajectory based on an extent of a side wind relative to the flight trajectory.

12. The method as claimed in claim 11, wherein the elongate or elliptical shape of the spiral climb maneuver has a lateral offset based on the side wind, and is used in calculating the width of the safety corridor.

* * * * *